(12) United States Patent
Arai et al.

(10) Patent No.: US 9,919,613 B2
(45) Date of Patent: Mar. 20, 2018

(54) BATTERY TEMPERATURE REGULATING DEVICE MOUNTED TO A VEHICLE WITH AN AIR CONDITIONER AND A BATTERY

(71) Applicant: Toyota Jidosha Kabushiki Kaisha, Toyota-shi, Aichi-ken (JP)

(72) Inventors: Kunihiko Arai, Owariasahi (JP); Yoshiaki Kawakami, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 242 days.

(21) Appl. No.: 14/656,010

(22) Filed: Mar. 12, 2015

(65) Prior Publication Data

US 2015/0266392 A1    Sep. 24, 2015

(30) Foreign Application Priority Data

Mar. 19, 2014    (JP) .................................. 2014-056361

(51) Int. Cl.
*B60L 11/18*    (2006.01)
*H01M 10/61*    (2014.01)
(Continued)

(52) U.S. Cl.
CPC ...... *B60L 11/1874* (2013.01); *B60H 1/00921* (2013.01); *B60H 1/143* (2013.01); *B60L 1/003* (2013.01); *B60L 1/02* (2013.01); *B60L 11/187* (2013.01); *B60L 11/1816* (2013.01); *B60L 11/1875* (2013.01); *H01M 10/61* (2015.04); *H01M 10/613* (2015.04);
(Continued)

(58) Field of Classification Search
CPC .... B60L 11/1875; B60L 11/187; H01M 10/61
USPC ........................................................ 320/150
See application file for complete search history.

(56) References Cited

U.S. PATENT DOCUMENTS 6,178,760 B1 * 1/2001 Tanaka ............... B60H 1/00392
                                                    62/154
9,827,846 B2 * 11/2017 Porras .................. B60K 11/085
(Continued)

FOREIGN PATENT DOCUMENTS

CN    102120412 A    7/2011
JP    H05124443 A    5/1993
(Continued)

*Primary Examiner* — Richard Isla Rodas
*Assistant Examiner* — Manuel Hernandez
(74) *Attorney, Agent, or Firm* — Dinsmore & Shohl LLP

(57) ABSTRACT

A battery temperature regulating device is provided with a low temperature heat exchanger configured to allow heat exchange with the air conditioning system, a battery temperature regulating unit configured to allow heat exchange with the low temperature heat exchanger so as to regulate the temperature of the battery to approach a target temperature, and a control unit configured to control the battery temperature regulating unit. In the case where the charging is performed from the power supply external to the vehicle, the control unit determines whether or not it is necessary to accumulate heat in the battery, and in the case where it is determined that the heat accumulation is necessary, the control unit sets the target temperature of the battery during charging higher than that in the case where it is determined that the heat accumulation is unnecessary.

3 Claims, 4 Drawing Sheets

(51) Int. Cl.
| | |
|---|---|
| *B60L 1/00* | (2006.01) |
| *B60L 1/02* | (2006.01) |
| *H01M 10/625* | (2014.01) |
| *H01M 10/615* | (2014.01) |
| *H01M 10/633* | (2014.01) |
| *H01M 10/657* | (2014.01) |
| *H01M 10/663* | (2014.01) |
| *H01M 10/6568* | (2014.01) |
| *H01M 10/635* | (2014.01) |
| *H01M 10/613* | (2014.01) |
| *B60H 1/00* | (2006.01) |
| *B60H 1/14* | (2006.01) |
| *H02J 7/04* | (2006.01) |
| *H01M 10/44* | (2006.01) |
| *H02J 7/00* | (2006.01) |
| *H01M 10/48* | (2006.01) |

(52) U.S. Cl.
CPC ....... *H01M 10/615* (2015.04); *H01M 10/625* (2015.04); *H01M 10/633* (2015.04); *H01M 10/635* (2015.04); *H01M 10/657* (2015.04); *H01M 10/6568* (2015.04); *H01M 10/663* (2015.04); *B60H 2001/00928* (2013.01); *B60H 2001/00949* (2013.01); *B60L 2240/34* (2013.01); *B60L 2240/545* (2013.01); *B60L 2240/662* (2013.01); *B60L 2240/80* (2013.01); *B60L 2250/14* (2013.01); *H01M 10/443* (2013.01); *H01M 10/486* (2013.01); *H01M 2220/20* (2013.01); *H02J 7/0091* (2013.01); *H02J 7/047* (2013.01); *Y02T 10/7005* (2013.01); *Y02T 10/705* (2013.01); *Y02T 10/7072* (2013.01); *Y02T 10/7291* (2013.01); *Y02T 90/14* (2013.01); *Y02T 90/16* (2013.01)

(56) References Cited

U.S. PATENT DOCUMENTS

| | | | |
|---|---|---|---|
| 2010/0089669 A1* | 4/2010 | Taguchi | B60H 1/00257 180/65.1 |
| 2011/0139397 A1 | 6/2011 | Haussmann | |
| 2012/0222438 A1* | 9/2012 | Osaka | B60H 1/00271 62/126 |
| 2013/0103240 A1* | 4/2013 | Sato | H01M 10/486 701/22 |
| 2013/0147432 A1* | 6/2013 | Yamamoto | H02J 7/0068 320/109 |
| 2013/0162027 A1* | 6/2013 | Yamamoto | H02J 7/0052 307/9.1 |
| 2013/0166119 A1* | 6/2013 | Kummer | H01M 10/443 701/22 |
| 2014/0002025 A1* | 1/2014 | Yamamoto | H01M 10/443 320/109 |
| 2014/0266071 A1* | 9/2014 | Tomiyasu | H02J 7/0091 320/150 |
| 2015/0266392 A1* | 9/2015 | Arai | B60L 11/1874 320/150 |
| 2016/0361990 A1* | 12/2016 | Porras | B60K 11/04 |
| 2017/0080821 A1* | 3/2017 | Hughes | H01M 10/613 |
| 2017/0088007 A1* | 3/2017 | Melendez | B60L 11/1874 |

FOREIGN PATENT DOCUMENTS

| | | |
|---|---|---|
| JP | 2011-068348 A | 4/2011 |
| WO | 2012-004926 A1 | 1/2012 |

\* cited by examiner

BATTERY TEMPERATURE REGULATING DEVICE MOUNTED TO A VEHICLE WITH AN AIR CONDITIONER AND A BATTERY

This non-provisional application is based on Japanese Patent Application 2014-056361 filed on Mar. 19, 2014 with the Japan Patent Office, the entire contents of which are hereby incorporated by reference.

BACKGROUND OF THE INVENTION

Field of the Invention

The present invention relates to a battery temperature regulating device, and in particular, relates to a battery temperature regulating device mounted on a vehicle including a battery configured to allow charging from a power supply external to the vehicle.

Description of the Background Art

An electric vehicle or a hybrid vehicle is mounted with a drive battery configured to supply power to a drive motor. If the battery is not charged and/or discharged at a proper temperature, it will prevent the battery to exhibit its performance sufficiently and will adversely affect the service life thereof, and thereby, a temperature regulating device for the battery is mounted on such vehicle.

In WO 2012/004926, a battery cooling device is disclosed. The battery cooling device utilizes a refrigerant in a refrigerant circulation system for air conditioning to cool the battery.

The battery cooling device described in WO 2012/004926 mentioned above, the heat of the battery is substantially discarded through cooling. Thus, sufficient studies have not been made on making effective utilization of this heat.

Particularly, since the heat from engine cannot be utilized to warm the compartment of a hybrid vehicle when the engine thereof is stopped and the heat from engine is not available for an electric vehicle without an engine, it is necessary to convert the electrical energy that is accumulated in the battery into heat so as to warm the passenger compartment, which consequently shortens the available traveling distance. Therefore, the inventors of the present application turn to investigate another approach of warming the compartment by preheating the battery with power received from a power supply external to the vehicle when charging the battery with the power received from the external power supply (hereinafter referred to as external charging), and using the heat in the battery to warm the compartment or the like. Since the drive battery in an electric vehicle or a hybrid vehicle is large in both size and heat capacity, it is possible to utilize the battery more effectively by using it as a heat accumulation unit. Raising the temperature of the battery during external charging is advantageous from the viewpoint of increasing the available travelling distance, however, raising the temperature of the battery to the same temperature without variation during external charging is disadvantageous from the viewpoint that additional power will be consumed.

SUMMARY OF THE INVENTION

The present invention has been accomplished in view of the aforementioned problems, and it is therefore an object of the present invention to provide a vehicular battery temperature regulating device which allows a battery to be utilized as a heat accumulation unit while suppressing unnecessary power consumption during external charging, enabling a longer available travel distance.

In summary, the present invention provides a battery temperature regulating device to be mounted on a vehicle including an air conditioning system, and a battery configured to allow charging from a power supply external to the vehicle. The battery temperature regulating device of the present invention is provided with a heat exchanging unit configured to allow heat exchange with the air conditioning system, a battery temperature regulating unit configured to allow heat exchange with the heat exchanging unit so as to regulate the temperature of the battery to approach a target temperature, and a control unit configured to control the battery temperature regulating unit. In the case where the charging is performed from the power supply external to the vehicle, the control unit determines whether or not it is necessary to accumulate heat in the battery, and in the case where it is determined that the heat accumulation is necessary, the control unit sets the target temperature of the battery during charging higher than that in the case where it is determined that the heat accumulation is unnecessary.

According to the configuration mentioned above, the target temperature of the battery is not set to the same temperature. Specifically, in the case where it is determined that the heat accumulation is necessary, the target temperature is set higher than that in the case where it is determined that the heat accumulation is unnecessary. Thus, it is possible to suppress the power consumption during external charging when the heat accumulation is unnecessary, and when the heat accumulation is necessary, it is possible to accumulate releasable heat in the battery.

Preferably, the control unit determines that the heat accumulation in the battery is necessary in the case where the outside air temperature is lower than a threshold, and determines that the heat accumulation in the battery is unnecessary in the case where the outside air temperature is higher than the threshold.

It is known that a heat pump to be used in the air conditioning system is at an extremely low temperature of about −20° C., the density of refrigerant in the heat pump will become lower, which consequently deteriorates the performance of the heat pump. Therefore, when the outside air temperature is low, the performance of the heat pump in the air conditioning system will drop, which may disable the air conditioning system. According to the configuration mentioned above, in the case where the outside air temperature is low, the heat is accumulated in the battery during external charging, and the heat can be utilized, for example, to warm the refrigerant in the heat pump of the air conditioning system so as to make it exhibit the air conditioning performance immediately. Note that the heat is not limited to being utilized in air conditioning, it may be utilized in other applications.

The battery temperature regulating unit includes a heater capable of heating the battery using the power received from the power supply external to the vehicle, and a battery heat exchanging unit configured to transfer the heat accumulated in the battery to the heat exchanging unit.

According to the configuration mentioned above, while the battery is being charged in external charging, the battery can be preheated by using the power received, it is possible to raise the temperature of the battery without reducing the electric power accumulated in the battery.

According to the present invention, it is possible to utilize the battery as a heat accumulation unit while eliminating unnecessary power consumption during external charging.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
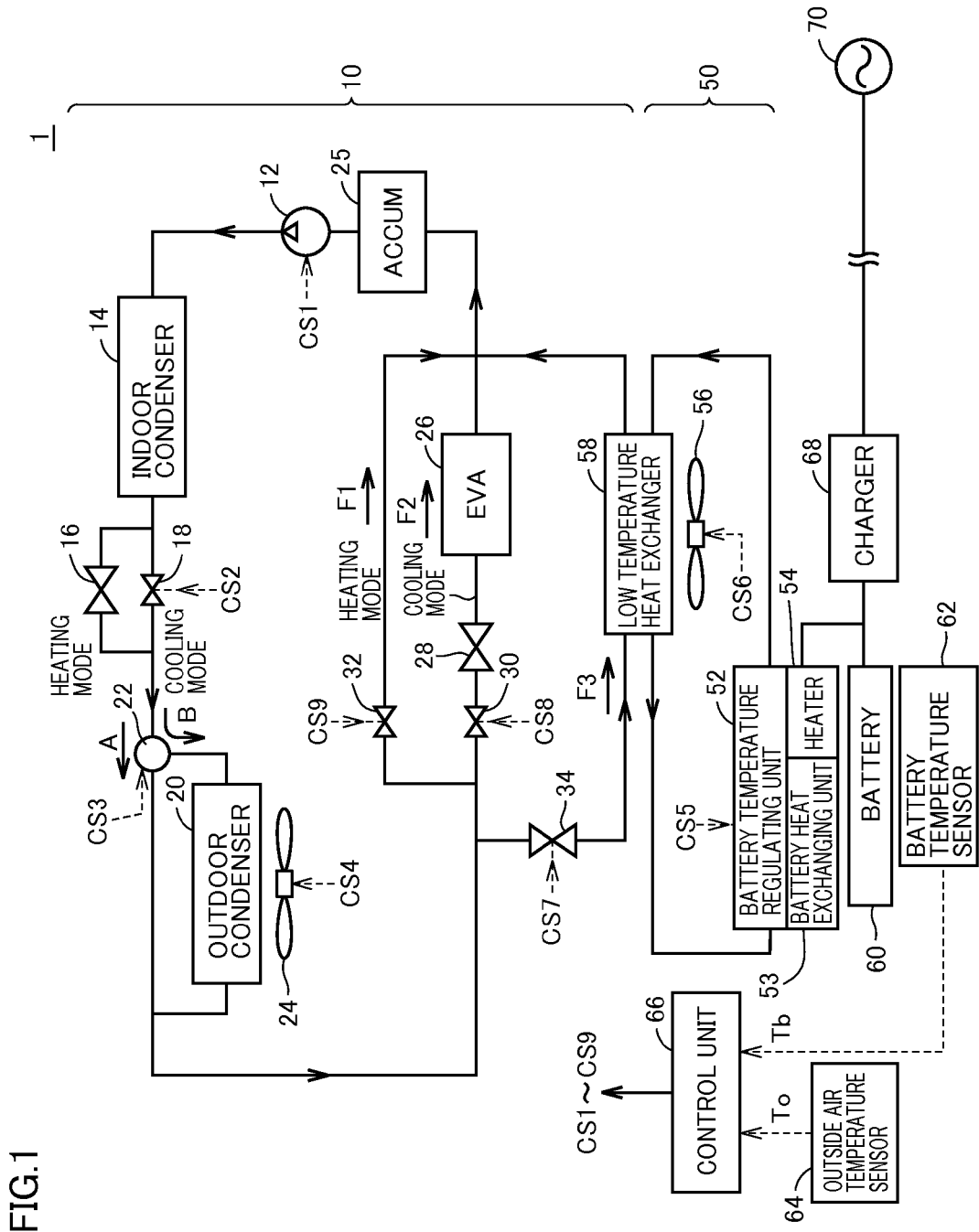
FIG. 1 is a diagram illustrating a configuration of a vehicle mounted with a battery temperature regulating device according to the present embodiment.

Hereinafter, embodiments of the present invention will be described in detail with reference to the drawings. It should be noted that in the drawings, the same or corresponding parts will be assigned with the same reference signs, and the description thereof will not be repeated.

FIG. 1 is a diagram illustrating a configuration of a vehicle mounted with the battery temperature regulating device according to the present embodiment. Referring to FIG. 1, a vehicle 1 includes an air conditioning system 10, a battery temperature regulating device 50, a battery 60, and a charger 68.

Charger 68 receives power from an external power supply 70 and supplies the received power to battery 60. Although charger 68 is illustrated as receiving the power from an external power supply through a charging cable equipped with an inlet (not shown), it is acceptable that the vehicle is configured to perform power exchange in an non-contact manner through an electromagnetic field or the like.

Air conditioning system 10 includes a compressor 12, an indoor condenser 14, an outdoor condenser 20, a fan 24, an evaporator 26, and an accumulator 25. Air conditioning system 10 further includes expansion valves 16 and 28, solenoid valves 18, 30 and 32, a three-way valve 22, and a flow-controlling expansion valve 34.

The refrigerant compressed by compressor 12 is guided to indoor condenser 14. The refrigerant passed through indoor condenser 14 flows through solenoid valve 18 in a cooling mode, and in a heating mode, solenoid valve 18 is closed, the refrigerant passes through expansion valve 16. The refrigerant passed through solenoid valve 18 or expansion valve 16 is guided by a three-way valve 22 to flow in one of a flow passage A which bypasses outdoor condenser 20 or a flow passage B which flows through outdoor condenser 20.

The refrigerant passed through outdoor condenser 20 or the flow passage which bypasses outdoor condenser 20 is made to flow in a bypass flow passage F1 in the heating mode where electromagnetic valve 30 is controlled to close and solenoid valve 32 is controlled to open, or flow in a flow passage F2 which flows through expansion valve 28 and evaporator 26 in the cooling mode where solenoid valve 30 is controlled to open and solenoid valve 32 is controlled to close.

A flow passage F3 is provided in parallel with flow passages F1 and F2. Flow passage F3 is provided for the purpose of performing heat exchange as required between the refrigerant for air conditioning and the refrigerant for regulating the temperature of the battery. Flow-controlling expansion valve 34 and a low-temperature heat exchanger 58 are disposed in flow passage F3. The refrigerant flowing through one of flow passages F1 to F3 is delivered to an accumulator 25 for gas-liquid separation, and the separated gas refrigerant is delivered to compressor 12.

In the present embodiment, the description will be carried out in such a case that heat is accumulated in battery 60 during external charging at an extremely low temperature, and the accumulated heat will be used in another application other than the battery, and thereby, the flow passage used in the heating mode will be selected as the refrigerant circulation passage in air conditioning system 10.

The battery temperature regulating device 50 is provided with a battery temperature regulating unit 52, low-temperature heat exchanger 58, a fan 56, a battery temperature sensor 62, an outside air temperature sensor 64, and a control unit 66.

Low-temperature heat exchanger 58 is configured to allow heat exchange with air conditioning system 10, which will be described hereinafter with reference to FIG. 2. Battery temperature regulating unit 52 is configured to allow heat exchange with low-temperature heat exchanger 58 through the refrigerant circulating therebetween so as to regulate the temperature of battery 60 to approach the target temperature thereof.

Control unit 66 is configured to output control signals CS1 to CS9 so as to control solenoid valves 18, 30 and 32, three-way valve 22, flow-controlling expansion valve 34, fans 24 and 56, and a heater 54. Control unit 66 may be provided separately to air conditioning system 10 and battery temperature regulating device 50.

For battery temperature regulating device 50, it is acceptable to circulate the liquid refrigerant by a pump, but it is preferable to use a thermo-siphon (bottom heating) type heat pipe system. If low-temperature heat exchanger 58 is disposed above battery 60 and battery temperature regulating unit 52 in the direction of gravitational force, it is possible to configure the battery temperature regulating device 58 into a thermo-siphon type heat pipe system which cools the battery with low-temperature heat exchanger 58 disposed above in the direction of gravitational force, and thereby, a compressor or a pump which will otherwise be provided to transfer the heat of battery 60 is dispensable.

Figure 2:
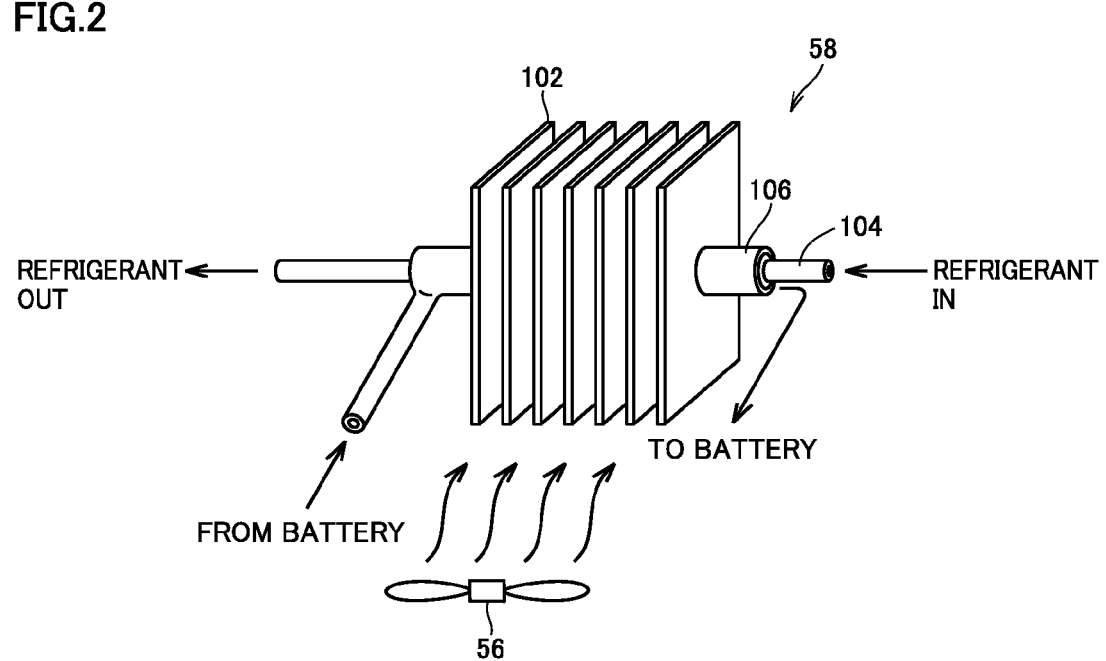
FIG. 2 is a diagram illustrating a configuration of a low-temperature heat exchanger.

FIG. 2 is a diagram illustrating the configuration of low-temperature heat exchanger 58. Low-temperature heat exchanger 58 is a dual-tube air-cooling type heat exchanger, and is provided with an inner tube 104, an outer tube 106, and cooling fins 102. The refrigerant of air conditioning system 10 flows through the interior side of inner tube 104. The refrigerant of battery temperature regulating unit 50 flows through the interior side of outer tube 106 which is located around the outer side of inner tube 104. It is preferable that air-cooling fins 102 are disposed at a position facing running winds, but it is not limited thereto. Air-cooling fins 102 use running winds while the vehicle is running so as to radiate heat. However, when the vehicle is not running, fan 56 is rotated as needed to provide winds to air-cooling fins 102 so as to release heat from air-cooling fins 102.

The refrigerant for regulating the temperature of battery 60 flows in outer tube 106, and the refrigerant in air conditioning system 10 flows in inner tube 104 in the opposite direction. Thereby, it is possible to transfer the heat from battery 60 to the refrigerant in air conditioning system 10. Moreover, by making the refrigerant of battery 60 flow in outer tube 106, the refrigerant of battery 60 can be cooled appropriately by air-cooling fins 102. This configuration makes it possible to preferentially use the low-cost air cooling to cool the battery.

Referring again to FIG. 1, battery temperature regulating device 50 of the present embodiment is configured to allow battery 60 to be preheated during external charging. Specifically, battery temperature regulating unit 52 of battery temperature regulating device 50 includes heater 54 capable of heating battery 60 using the power received from a power supply external to the vehicle, and a battery heat exchanging unit 53 configured to obtain heat accumulated in battery 60. Heat is accumulated in battery 60 when it is heated by heater 54 or through self-heating during charging.

The reason why battery 60 should be preheated during external charging will be explained as follows. If battery 60 is not charged and/or discharged at a proper temperature, the performance thereof will be degraded and/or the service life will be shortened. Therefore, battery 60 is heated or cooled by battery temperature regulating unit 52 so that the temperature of battery 60 is kept within an appropriate range. In particular, when the outside air temperature is low, battery 60 is preheated by using heater 54 so as to make battery exhibit better performance after being charged from an external power supply.

Since the battery mounted on an electric vehicle or a plug-in hybrid vehicle is large in both size and heat capacity, it is hard to be warmed up or cooled down. In the present embodiment, this characteristic is utilized to accumulate heat in battery 60 during external charging and use the heat accumulated in another application other than the battery.

Control unit 66 controls battery temperature regulating unit 52 to accumulate heat in battery 60 where necessary so as to utilize the heat later. When the charging is performed from an external power supply to the vehicle, control unit 66 determines whether or not it is necessary to accumulate heat in battery 60, and in the case where it is determined that the heat accumulation is necessary, control unit 66 sets the target temperature of the battery during external charging higher than that in the case where it is determined that the heat accumulation is unnecessary. Preferably, control unit 66 determines that the heat accumulation in battery 60 is necessary in the case where the outside air temperature is lower than a threshold, and determines that the heat accumulation in battery 60 is unnecessary in the case where the outside air temperature is higher than the threshold.

Raising the temperature of the battery during external charging is advantageous from the viewpoint of increasing the available travelling distance, however, raising the temperature of the battery to the same temperature without variation during external charging is disadvantageous from the viewpoint that additional power will be consumed. According to the present invention, control unit 66 determines whether or not it is necessary to accumulate heat in battery 60, and thus, it is possible to suppress the power consumption during external charging when the heat accumulation is unnecessary, and when the heat accumulation is necessary, it is possible to accumulate releasable heat in the battery.

Hereinafter, the control performed by control unit 66 will be described in the present embodiment. The process of accumulating heat in battery 60 will be described with reference to FIG. 3, and the process of releasing heat from battery 60 will be described with reference to FIG. 4.

Figure 3:
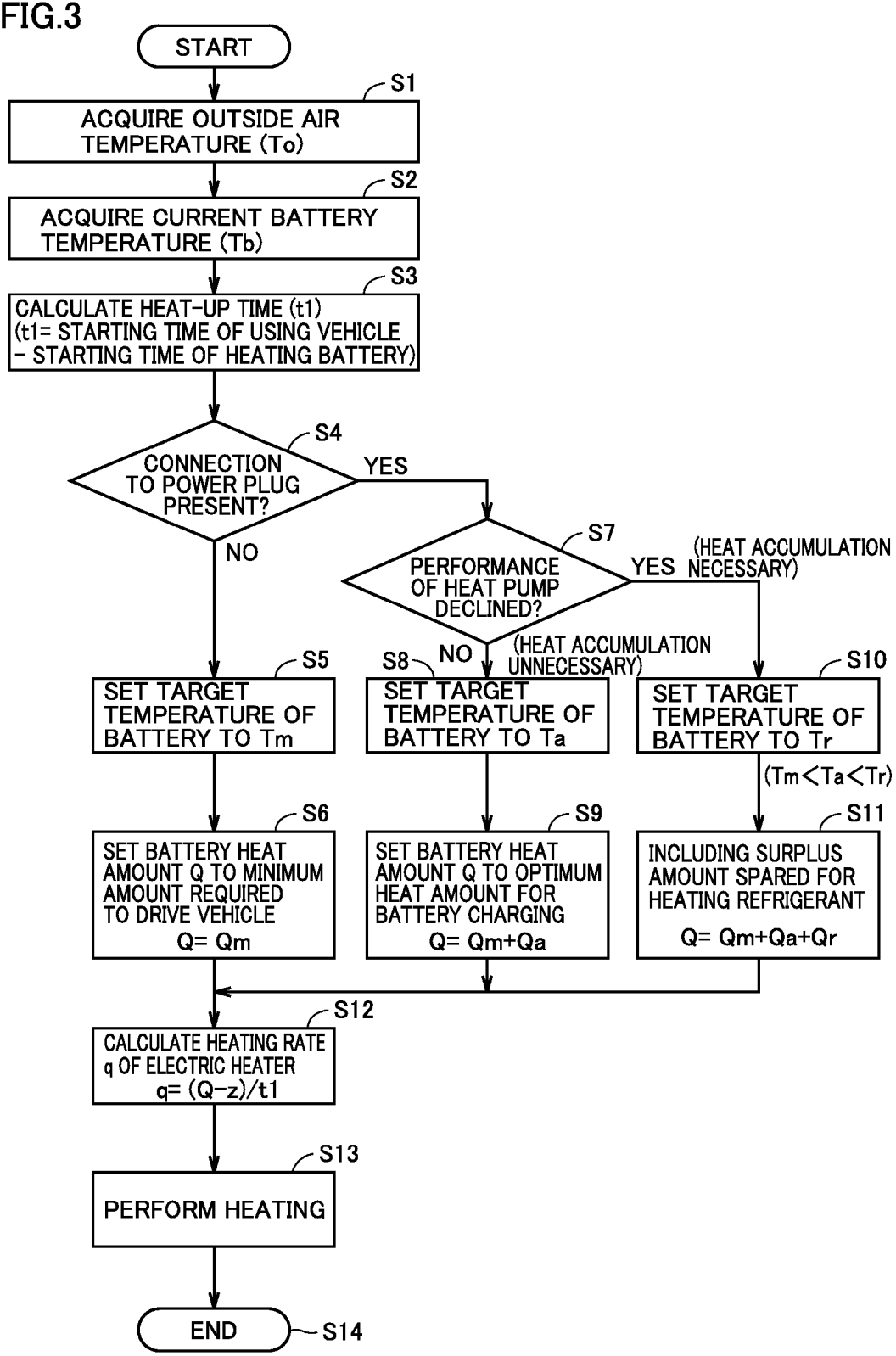
FIG. 3 is a flowchart for explaining the control of accumulating heat in a battery during external charging.

FIG. 3 is a flowchart for explaining the control of accumulating heat in the battery during external charging. With reference to FIGS. 1 and 3, when the process of the flowchart is started, control unit 66 acquires an outside air temperature To from outside air temperature sensor 64 at step S1. Subsequently at step S2, control unit 66 acquires a current battery temperature Tb from the battery temperature sensor 62.

At step S3, control unit 66 calculates a heat-up time t1. Heat-up time t1 indicates a time interval available for heating battery 60. For example, heat-up time t1 may be obtained as a time difference between a starting time of heating the battery and a starting time of using the vehicle. In the case of external charging, the starting time of heating the battery may set at a time where the charging is initiated or a time later than the time where the charging is initiated. When the starting time of using the vehicle is provided by the user, control unit 66 sets the starting time of heating the battery (i.e., the starting time of performing the charging) so as to complete the charging before the starting time of using the vehicle.

Next at step S4, control unit 66 determines whether or not a connection to a power plug is present. Although not shown in the drawings, an inlet is provided in the body of the vehicle and located between charger 68 and external power supply 70, and a charging connector that corresponds to the power plug can be connected to the inlet. Whether or not the charging connector is connected to the inlet is detected by a sensor for detecting the connection of the inlet. In the case where the charging connector is connected to the inlet, control unit 66, at step S4, determines that the connection to the power plug is present. It should be noted that in the case where the charging is performed in a non-contact manner, control unit 66 determines whether or not the power exchange between an external power supply is available, and if the power exchange is available, control unit 66 determines that the connection to the power plug is present.

In the case where control unit 66 determines that there is no connection to the power plug at step S4 (NO at S4), the process proceeds to step S5. At step S5, control unit 66 sets the target temperature of the battery to a temperature Tm during heating. Temperature Tm is the minimum temperature (the lower temperature limit) within a battery temperature range where the battery is operational. During the travelling, the battery will generate heat itself due to the charging and/or discharging of the battery, and thus, heating battery 60 higher than temperature Tm causes a waste of power energy. Therefore, it is possible to minimize the power consumption during external charging by setting the target temperature of the battery to the lower temperature limit Tm.

At step S6, control unit 66 sets a battery heat amount Q to a minimum amount Qm required for the driving of the vehicle. Minimum amount Qm may be calculated by Qm=C*(Tm−Tb), wherein C represents the heat capacity of the battery.

On the other hand, in the case where control unit 66 determines that there is a connection to the power plug at step S4 (YES at S4), the process proceeds to step S7. At step S7, control unit 66 determines whether or not the performance of the heat pump for air conditioning system 10 is declined. Specifically, in the case where outside air temperature To is higher than a low temperature threshold which corresponds to a temperature indicating the decline of the performance of the refrigerant in the heat pump, control unit 66 determines that the performance of the heat pump is not declined. In the case where outside air temperature To is lower than the low temperature threshold, control unit 66 determines that the performance of the heat pump is declined. In other words, at step S4, control unit 66 determines whether or not it is necessary to accumulate surplus heat in battery 60. Control unit 66 determines that it is necessary to accumulate heat in battery 60 when the outside air temperature is lower than the threshold, and determines that it is unnecessary to accumulate heat in battery 60 when the outside air temperature is higher than the threshold.

In the case where it is determined that the performance of the heat pump is not declined (the heat accumulation is unnecessary) at step S7 (NO at S7), since the performance of air conditioning system 10 is not declined, the heating may be performed by air conditioning system 10. Thus, at step S8, control unit 66 sets the target temperature of the battery to a temperature Ta. Temperature Ta is an optimal temperature for charging battery 60 within the battery operational temperature range, and Ta>Tm.

Then, at step S9, control unit 66 calculates battery heat amount Q. In the present embodiment, battery heat amount Q is obtained by adding Qa to Qm which is calculated at step S6. Qa represents the amount of heat required to heat battery 60 from temperature Tm to temperature Ta.

On the other hand, in the case where it is determined that the performance of the heat pump is declined (the heat accumulation is necessary) at step S7 (YES at S7), in order to make air conditioning system 10 perform heating quickly, it is preferable to transfer the heat from battery 60 to the refrigerant in air conditioning system 10 at the start-up of the vehicle. For this purpose, control unit 66, at step S10, sets the target temperature of the battery to a temperature Tr. Temperature Tr is within the battery operational temperature range and is higher than the optimal temperature Ta for charging battery 60. Temperature Tr may be set in consideration of the fact a surplus amount of heat to be transferred to the refrigerant in air conditioning system 10 should be accumulated in battery 60. In the present embodiment, Tr>Ta>Tm.

Then, at step S11, control unit 66 calculates battery heat amount Q. In the present embodiment, battery heat amount Q is obtained by adding Qr to the sum of Qm calculated at S6 and Qa calculated at S9. Qr represents the heat amount required for heating battery 60 from temperature Ta to temperature Tr.

After battery heat amount Q is calculated at any step S6, S9 or S11, the process proceeds to step S12. At step S12, control unit 66 calculates a heating rate q of the electric heater 54.

Heating rate q represents the heat amount per unit time and is calculated according to $q=(Q-z)/t1$. Here, Q represents the heat amount calculated at any step S6, S9 or S11, z represents the amount of heat generated per unit time by battery 60 itself when battery 60 is being charged, and t1 represents the heat-up time determined at step S3.

Then, at step S13, control unit 66 performs the heating of battery 60. When the power plug is connected, battery 60 is also charged at the same time. After heat-up time t1 has elapsed, the heating of battery 60 is ended at step S14.

In addition, when the heating and/or the charging is not performed at a constant speed, it is acceptable to carry out the process by correcting heating rate q appropriately while monitoring battery temperature Tb.

According to the control performed as illustrated in FIG. 3, it is possible to preheat battery 60 where necessary during external charging without wasting the power energy.

Figure 4:
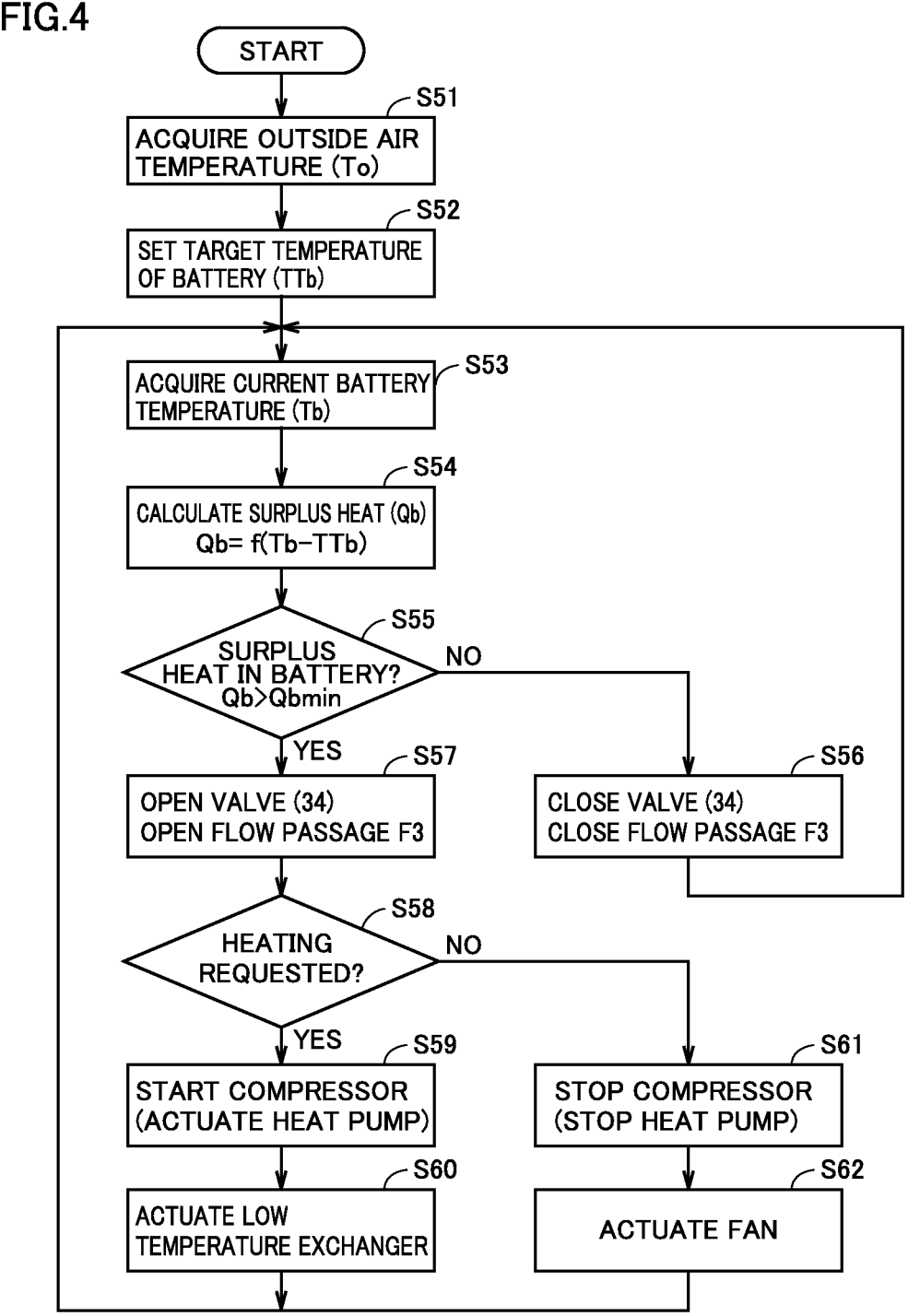
FIG. 4 is a flowchart for explaining an example of utilizing the heat accumulated in the battery to air conditioning at the startup of the vehicle.

FIG. 4 is a flowchart for explaining an example of utilizing the heat accumulated in the battery in air conditioning at the startup of the vehicle. With reference to FIGS. 1 and 4, when the vehicle is started by operating an ignition key switch or the like, control unit 66, at step S51, acquires outside air temperature To from outside air temperature sensor 64.

At a subsequent step S52, control unit 66 sets a battery target temperature TTb. Battery target temperature TTb is optimal for battery 60 to exhibit its performance.

Next, control unit 66 acquires current battery temperature Tb from the battery temperature sensor 62 at step S53, and calculates battery surplus heat Qb at step S54. For example, battery surplus heat Qb may be calculated according to a function f(Tb-TTb) that monotonically increases along with the value of (Tb-TTb), and Qb may also be determined from Tb and TTb according to a experimentally obtained map or the like.

At step S55, control unit 66 determines whether battery 60 has surplus heat. Generally, if Qb>0, the battery has the surplus heat. However, if the battery surplus heat Qb is too small, the heat will be consumed in a very short time. Thus, at step S55, battery 60 is determined to have the surplus heat when Qb is larger than a threshold Qbmin.

In the case where it is determined that battery 60 has no surplus heat at step S55 (NO at S55), the process proceeds to step S56. In this situation, if the heat is transferred from battery 60 to the refrigerant in air conditioning system 10, the temperature of battery 60 would drop lower than the optimal temperature, and thus at step S56, control unit 66 closes flow-controlling expansion valve 34 so as to prevent the refrigerant in the air conditioning system from flowing through flow passage F3. Furthermore, control unit 66 stops fan 56 configured to blow winds toward air-cooling fins 102.

On the other hand, in the case where it is determined that battery 60 has surplus heat at step S55 (YES at S55), the process proceeds to step S57. At step S57, in order to transfer heat from battery 60 to the refrigerant in air conditioning system 10, control unit 66 opens flow-controlling expansion valve 34 so as to allow the refrigerant in air conditioning system 10 to flow through flow passage F3. Then, at step S58, control unit 66 determines whether or not a heating request is issued. The heating request is issued as a user switches on a heating switch in the air conditioning system, and the heating request may be issued by a timer or the like which is set to run the heating at a set time. If there is a heating request, in order to perform the heating as early as possible, it is desirable to transfer the surplus heat of battery 60 to the refrigerant for air conditioning so as to improve the performance of the heat pump.

Thus, in the case where there is a heating request at step S58, the process proceeds to step S59 where control unit 66 starts compressor 12 and circulates the air conditioning refrigerant in the heating passage of air conditioning system 10. At the same time, since flow-controlling expansion valve 34 is opened, the air conditioning refrigerant also circulates into low-temperature heat exchanger 58. Thus, at step S60, low-temperature heat exchanger 58 is actuated, and the surplus heat of battery 60 is transferred to the air conditioning refrigerant, heating up the air conditioning refrigerant quickly. This makes it possible to improve the performance of air conditioning system 10 at an extremely low temperature at which the performance of the air conditioning system is low.

On the other hand, in the case where there is no heating request issued at step S58 (NO at S58), the process proceeds to step S61. At step S61, control unit 66 stops compressor 12. As a result, the air conditioning refrigerant does not circulate in the low temperature heat exchanger. Thereby, no heat exchange occurs between battery 60 and the air conditioning refrigerant. However, if battery 60 becomes overheated in this state, control unit 66, at step S62, actuates fan 56 where necessary to cool by air the refrigerant of battery temperature regulating device 50 so as to cool battery 60.

After step S60 or step S62, the process returns to step S53 to acquire current battery temperature Tb again, and repeats the subsequent steps.

By performing the control according to the above process, the heat accumulated in battery 60 is transferred to the refrigerant in air conditioning system 10 where necessary. This makes it possible for air conditioning system 10 to exhibit its performance immediately after external charging even at an extremely low temperature.

Although in the configuration of FIG. 1, the heating mode and the cooling mode are switched by operating solenoid valves 30 and 32, it is acceptable to provide a three-way valve instead of solenoid valves 30 and 32 so as to selectively deliver the refrigerant to any one of flow passages F1 and F2.

In the present embodiment, it is described by way of example that the heat accumulated in the battery during external charging is utilized to heat up the refrigerant in the air conditioning system, the heat is not limited to air conditioning but may be utilized in other applications. For example, the battery may be configured to perform heat exchange with an engine or a purification catalyst for purifying exhaust gas so as to use the heat of the battery to warm up the engine or the purification catalyst.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A battery temperature regulating device to be mounted on a vehicle including an air conditioning system, and a battery configured to allow charging from a power supply external to the vehicle by connecting a charging connector to an inlet, comprising:

a heat exchanging unit configured to allow heat exchange with the air conditioning system;

a battery temperature regulating unit configured to allow heat exchange with the heat exchanging unit so as to regulate the temperature of the battery to approach a target temperature; and a control unit configured to control the battery temperature regulating unit, the control unit configured to set the target temperature of the battery to a first temperature when the charging connector is not connected to the inlet, the control unit configured to set the target temperature of the battery to a second temperature when the charging connector is connected to the inlet and an outside air temperature is greater than a threshold value, the second temperature being greater than the first temperature and the control unit configured to set the target temperature of the battery to a third temperature when the charging connector is connected to the inlet and the outside air temperature is lower than the threshold value, the third temperature being greater than the second temperature.

2. The battery temperature regulating device according to claim 1, wherein the battery temperature regulating unit includes a heater capable of heating the battery using the power received from the power supply external to the vehicle, and the control unit is configured to calculate a heating rate indicating a heating amount per unit time corresponding to the target temperature of the battery and heats the battery at the heating rate by using the heater.

3. The battery temperature regulating device according to claim 1, wherein the air conditioner is configured to compress a first refrigerant, the heat exchanging unit is configured to perform heat exchange between a second refrigerant and the first refrigerant, and the battery temperature control unit includes a battery heat exchange unit configured to perform heat exchange between the second refrigerant and the battery.

\* \* \* \* \*

UNITED STATES PATENT AND TRADEMARK OFFICE
CERTIFICATE OF CORRECTION

PATENT NO. : 9,919,613 B2
APPLICATION NO. : 14/656010
DATED : March 20, 2018
INVENTOR(S) : Kunihiko Arai and Yoshiaki Kawakami It is certified that error appears in the above-identified patent and that said Letters Patent is hereby corrected as shown below:

In the Specification

In Column 6, Line 6, delete "t1indicates" and insert --t1 indicates--, therefor.

In Column 6, Line 7, delete "t1may" and insert --t1 may--, therefor.

Signed and Sealed this
Twelfth Day of June, 2018

Andrei Iancu
*Director of the United States Patent and Trademark Office*